Patented Feb. 14, 1933

1,897,428

UNITED STATES PATENT OFFICE

WINFRID HENTRICH, OF NUREMBERG, AND FRANZ WIENERS AND RICHARD STROEBEL, OF OPLADEN, GERMANY, ASSIGNORS TO GENERAL ANILINE WORKS, INC., OF NEW YORK, N. Y., A CORPORATION OF DELAWARE

VAT DYESTUFFS OF THE ANTHRAQUINONE CYANURIC SERIES

No Drawing. Application filed February 17, 1931, Serial No. 516,512, and in Germany February 19, 1930.

The present invention relates to new vat dyestuffs of the anthraquinone series.

In accordance with the invention new valuable vat dyestuffs of the anthraquinone series are obtained by reacting upon a dihalogen-triazine being substituted by an aliphatic, aliphatic-aromatic, aromatic or hydroaromatic radicle with an alpha-aminoanthraquinone or a nuclear substitution product thereof. The reaction may be performed by dissolving or distributing the reaction components in a high boiling organic solvent, such as nitrobenzene, ortho-dichlorobenzene, trichlorobenzene etc. and heating the reaction mixture, for example to about 90–130° C. until the dyestuff formed has separated. As starting materials we prefer alpha-aminoanthraquinone or an aroylamino derivative thereof as the one component, and as the other component a substituted 1.3.5-triazine halogenide corresponding to the probable formula

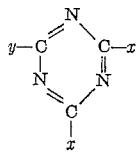

wherein the $x$'s mean chlorine or bromine, $y$ stands for alkyl-, cyclohexyl-, benzyl or phenyl groups, which two latter groups may be substituted in the nucleus by alkyl groups.

The triazine derivatives in question, which in part are unknown up-to-date may be prepared by reacting upon a cyanuryl halogenide with an alkyl-magnesiumbromide, an aralkyl-magnesiumbromide or cyclohexyl-magnesiumbromide. The aryl-dihalogen triazines are obtainable by reacting upon dicyandiamide with an aroylchloride, treating the aryl-amino-hydroxytriazines thus formed with sulfuric acid to yield aryl-dihydroxytriazines and reacting upon the latter compounds with a phosphorous penta-halogenide.

The compounds obtainable from these triazine derivatives with alpha-aminoanthraquinones probably correspond to the formula

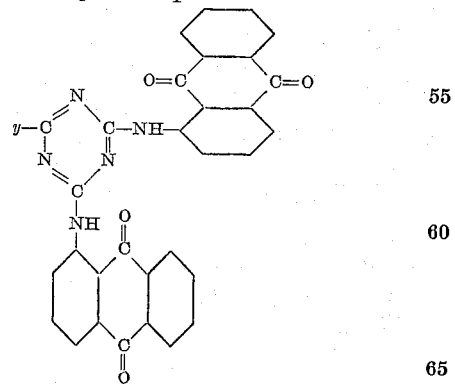

wherein $y$ stands for an alkyl, aralkyl, aryl or hydroaryl and wherein the anthraquinone nuclei may be substituted by monovalent substituents. They are powerful vat dyestuffs possessing satisfactory fastness properties and in particular a good fastness to light which latter is in general superior to the fastness to light of dyestuffs obtained by reacting with aminoanthraquinones on other cyanuryl derivatives. Furthermore, the new dyestuffs are generally more fast to alkalies and in many cases more powerful and clearer than the known dyestuffs above mentioned, and yield dyeings in which the fibre is generally less weakener by prolonged exposure to light than in the case of dyeings prepared by the use of the said known dyestuffs.

The following examples illustrate our invention without limiting it thereto, the parts being by weight:—

*Example 1.*—89 parts of alpha-aminoanthraquinone are stirred into 1000 parts of nitrobenzene at about 100° C. and 33 parts of 2-methyl-4.6-dichloro-1.3.5-triazine are added. Reaction begins at once and heating to 100° C. is continued until the dyestuff formed has separated. After cooling the reaction product is sucked off, washed with nitrobenzene and alcohol and dried.

100 parts of the reaction product are thus obtained in form of yellow needles dyeing cotton from an alkaline hydrosulfite vat clear greenish-yellow shades of good fastness properties.

*Example 2.*—90 parts of alpha-aminoanthraquinone are condensed as described in Example 1 with 36 parts of ethyldichloro-1.3.5-triazine. Yellow needles are thus obtained dyeing cotton a greenish yellow of similar properties as described in Example 1.

*Example 3.*—68 parts of 1-amino-4-benzoylaminoanthraquinone are heated in about 1200 parts of nitrobenzene to 120° C. at which temperature 20.6 parts of n-butyldichloro-1.3.5-triazine are added. The reaction, which soon begins, is finished within about 5–6 hours while slowly raising the temperature to 140° C. After working up in the usual manner red needles are obtained dyeing cotton a clear bluish red of good fastness properties. When applying in this example instead of the 1-amino-4-benzoylaminoanthraquinone another 1-amino-4-aroylaminoanthraquinone, for example, 1-amino-4-metamethoxybenzoyl-aminoanthraquinone or 1-amino-4-naphthoylaminoanthraquinone dyestuffs of similar properties are obtained.

*Example 4.*—101 parts of 1-amino-4-methoxy-anthraquinone are dissolved in 2000 parts of nitrobenzene and at a temperature of 120° C. 48 parts of benzyl-dichloro-1.3.5-triazine are added, whereupon a light colored compound separates. The reaction mixture is heated at 120° C. for about 4–5 hours, until the light colored compound has disappeared and the evolution of hydrochloric acid gas ceases. After cooling, the reaction product separates in form of red crystals which dye cotton from an alkaline hydrosulfite vat very clear orange shades of excellent fastness properties.

When starting in this example, instead of the benzyldichloro-1.3.5-triazine, with a derivative thereof being substituted in the benzene nucleus by alkyl groups, dyestuffs of similar properties are obtained.

*Example 5.*—67 parts of alpha-aminoanthraquinone are dissolved at about 110° C. in 1500 parts of trichloro-benzene, whereupon 35 parts of cyclohexyl-1.3.5-triazine are added. The reaction mixture is heated for 4 hours to 110–115° C. and then for 2–3 hours to 120–125° C. The dyestuff separates in form of yellow needles, which are sucked off after cooling, washed with a little trichlorobenzene and alcohol and dried. The reaction product dyes cotton from an alkaline hydrosulfite vat clear yellow shades of good fastness properties.

*Example 6.*—90 parts of 1-amino-5-benzoylaminoanthraquinone are dissolved at 130° C. in 150 parts of nitrobenzene, whereupon 24 parts of ethyl-dichloro-1.3.5-triazine are added. The reaction mixture is kept at the temperature mentioned until no further reaction product separates. After cooling the reaction product is sucked off, washed with nitrobenzene and alcohol and dried. An orange colored crystal powder is thus obtained dyeing cotton from an alkaline hydrosulfite vat golden orange shades of excellent fastness properties.

*Example 7.*—50 parts by weight of 1-aminoanthraquinone and 27 parts by weight of phenyldichlorotriazine are stirred for 4 hours at 100–110° C. in 750 parts of nitrobenzene. After a short time there begins a separation of small yellow needles, which finally ceases. The dyestuff is filtered by suction, washed a little, if necessary and dried. The yield amounts to 90–95% of the theoretical. The dyestuff dyes cotton from a red vat a powerful very clear yellow of very satisfactory fastness properties.

*Example 8.*—136 parts by weight of 1-amino-5-benzoylaminoanthraquinone are suspended in 2000 parts by weight of trichlorobenzene and converted into the hydrochloride by passing in hydrochloric acid. 50 parts by weight of phenyldichlorotriazine are added at 110° C. and the whole is stirred at 110–120° C. until the separation of the dyestuff ceases. The dyestuff is separated from the solvent and after drying an orange colored powder is obtained, which yields from the vat clear golden orange dyeings of very satisfactory fastness properties. The yield of dyestuff in this case approaches the theoretical.

*Example 9.*—100 parts of 1-amino-4-benzoylaminoanthraquinone are stirred at about 120° C. with 36 parts of phenyldichlorotriazine in 1500 parts of nitrobenzene until the separation of the dyestuff is complete. After the separation of the solvent there remains in more than 90% yield a red vat dyestuff of very satisfactory fastness properties.

The corresponding condensation of two molecular proportions of 1-amino-4-methoxyanthraquinone with one molecular proportion of phenyldichlorotriazine leads to a vat dyestuff, which dyes cotton from the vat after hanging a vivid orange of similar satisfactory fastness properties.

We claim:—

1. The new vat dyestuffs of the probable formula:—

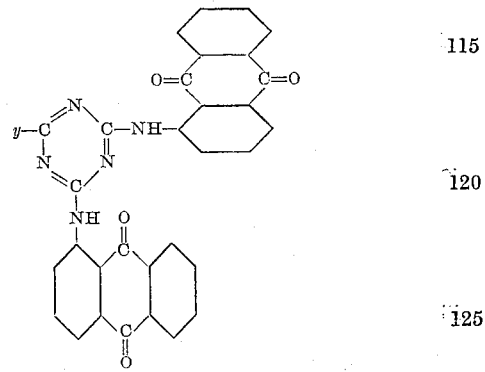

wherein $y$ means alkyl, cyclohexyl, benzyl- or phenyl, and wherein the anthraquinone nuclei may be substituted by aroylamino or alkoxy groups, said dyestuffs being powerful vat dyestuffs of various shades possessing satisfactory fastness properties especially to light and alkalies.

2. The new vat dyestuffs of the probable formula:—

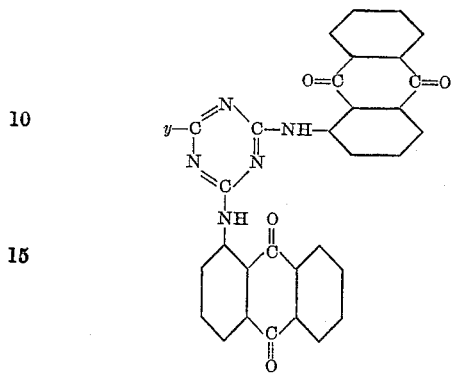

wherein $y$ means methyl, ethyl, cyclohexyl, benzyl- or phenyl, and wherein the anthraquinone nuclei may be substituted by aroylamino groups, said dyestuffs being powerful vat dyestuffs of various shades possessing satisfactory fastness properties especially to light and alkalies.

3. The new vat dyestuffs of the probable general formula:—

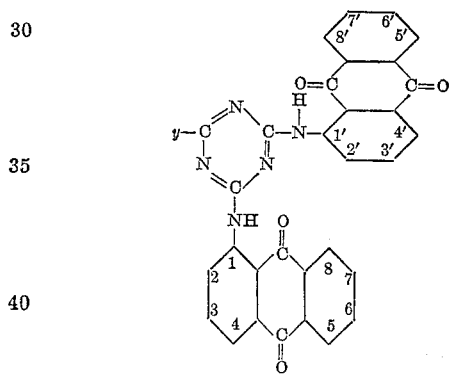

wherein $y$ means methyl, ethyl or phenyl, and in which both the anthraquinone nuclei may be substituted by benzoylamino groups in 4.4'- or 5.5'- position, said dyestuffs being powerful vat dyestuffs of various shades possessing satisfactory fastness properties especially to light and alkalies.

4. The new vat dyestuff of the probable formula:—

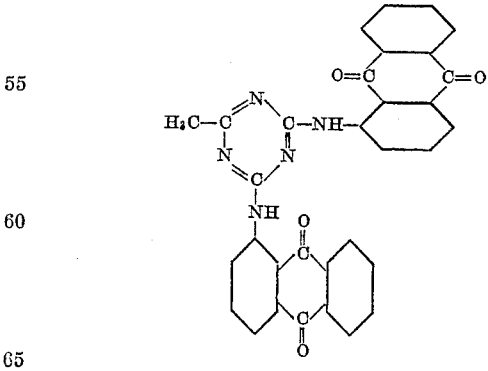

said dyestuff forming yellow needles dyeing cotton from an alkaline hydrosulfite vat strong greenish yellow shades of good fastness properties.

5. The new vat dyestuff of the probable formula:—

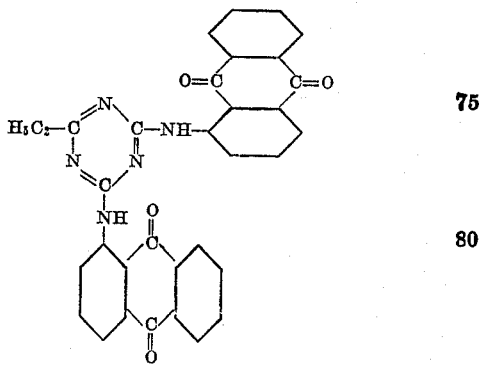

said dyestuff forming yellow needles dyeing cotton from an alkaline hydrosulfite vat strong greenish yellow shades of good fastness properties.

6. The new vat dyestuff of the probable formula:—

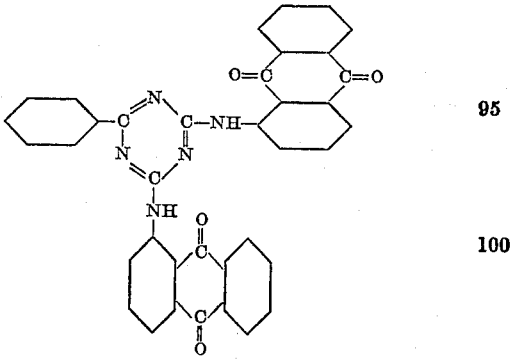

said dyestuff forming yellow needles dyeing cotton from an alkaline hydrosulfite vat strong yellow shades of good fastness properties.

In testimony whereof, we affix our signatures.

WINFRID HENTRICH.
FRANZ WIENERS.
RICHARD STROEBEL.